Feb. 24, 1942. A. E. BAAK 2,274,119
AUTOMATIC SWITCHING MECHANISM
Filed Sept. 1, 1939 2 Sheets-Sheet 1

Inventor
Albert E. Baak
By George H Fish
Attorney

Feb. 24, 1942.　　　　A. E. BAAK　　　　2,274,119
AUTOMATIC SWITCHING MECHANISM
Filed Sept. 1, 1939　　　　2 Sheets-Sheet 2
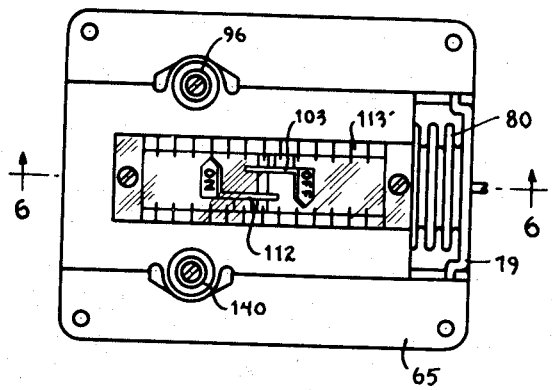
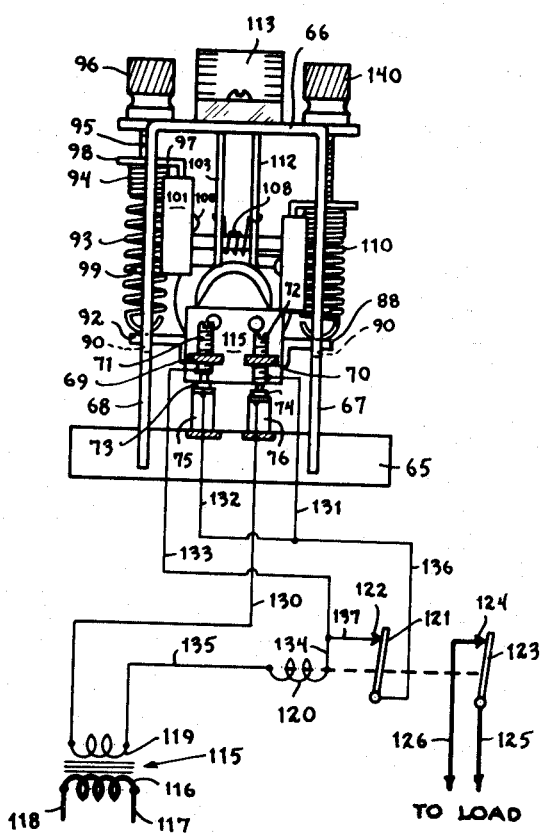
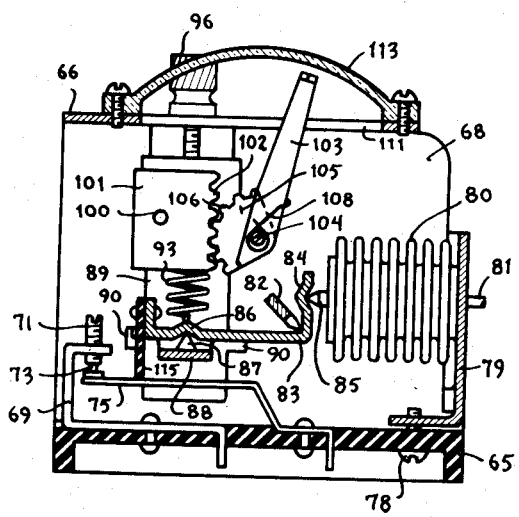
Inventor
Albert E. Baak
By George H Fisher
Attorney Patented Feb. 24, 1942

2,274,119

UNITED STATES PATENT OFFICE 2,274,119

AUTOMATIC SWITCHING MECHANISM

Albert E. Baak, Minneapolis, Minn., assignor to Minneapolis-Honeywell Regulator Company, Minneapolis, Minn., a corporation of Delaware Application September 1, 1939, Serial No. 293,080

14 Claims. (Cl. 200—83)

This invention relates generally to switches which are automatically controlled in response to the variations of a variable condition. It is more particularly concerned with the automatic actuation of a single switch in which the cut-in and cut-out points of the switch are independently varied. It is also concerned with the sequential actuation of a pair of switches by a single condition responsive device wherein the condition value at which each switch is actuated may be varied independently of the other.

It is one of the objects of the present invention to accomplish the desired result by rotating a control member through a given path by means of a condition responsive device and resisting the movement of the member through one portion of its path by a first adjustable spring and resisting its movement through the remaining portion of its path by a second adjustable spring. The control member may be connected to a mercury switch so as to close the circuit therethrough as it moves through one portion of its path and open the circuit as it moves through the other portion of its path. In this manner the condition values at which the circuit is made and broken may be independently adjusted by adjusting each spring.

Another object of the invention is to connect the control member to a pair of switches so that one of the switches is actuated by the control member as it moves through one portion of its path and the other switch is actuated as the control member moves through the other portion of its path. By adjusting each spring the condition value at which each switch is operated may be independently varied.

Another object of the invention is to enclose the moving parts of the mechanism in a switch casing and to provide the switch casing with a window through which a pair of indicating arms are visible, these arms being connected to the adjusting devices for the springs whereby they will indicate the adjustment of each spring. These indications may be read directly as values of the condition to which the condition responsive device responds.

These and other objects will readily become apparent as the following specification is read in the light of the accompanying drawings in which:

Figure 4 is a plan view of a third modification of the invention;

Figure 5 is an end view of the modification shown in Figure 4, a circuit diagram appearing in combination therewith, and Figure 6 is a section taken along the line 6—6 of Figure 4 and looking in the direction of the arrows.

Figure 1:
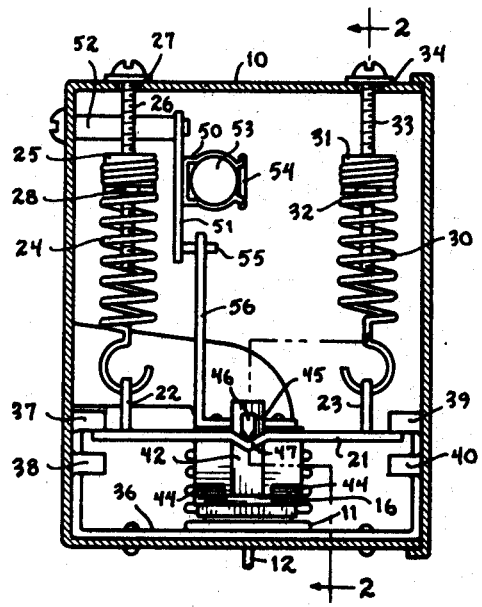
Figure 1 is an end sectional view of one form of my invention taken along the line 1—1 of Figure 2 looking in the direction of the arrows.
Figure 2:
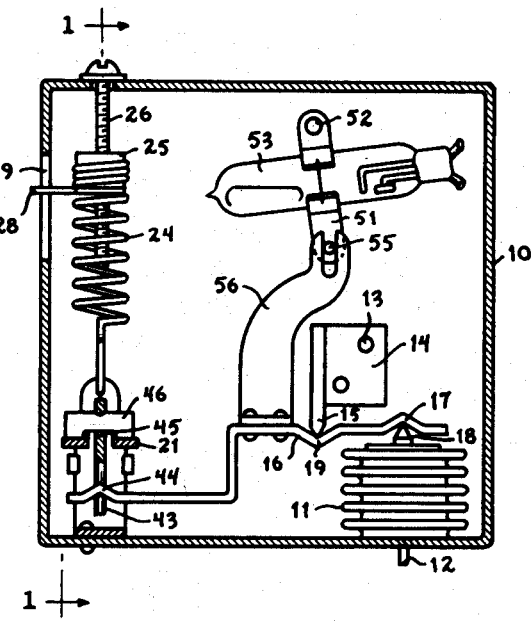
Figure 2 is a side view in section taken along the line 2—2 of Figure 1.

Referring now to the modification disclosed in Figures 1 and 2, the reference numeral 10 indicates the housing for the switch mechanism of my invention. A bellows 11 rests on the bottom of the housing 10 and is connected by means of the capillary tube 12 to a source of variable pressure or to a remotely located thermal bulb. It will also be appreciated that other types of responsive mechanisms may be substituted for the bellows 11.

Connected to the rear of the casing 10 by means of the rivets 13 is a bracket 14 having a knife edge 15. A main operating lever 16 is provided with a depression 17 in which the bearing member 18 carried by the bellows 11 is adapted to seat. The lever 16 is provided with a second depression 19 which receives the knife edge 15 which forms a fulcrum for the lever.

A floating lever 21 is provided at each end with a pair of upstanding ears 22 and 23. Engaged in the ear 22 is the lower end of a tension spring 24, the upper end of which is connected to a tapped nut 25. A screw 26 screw-threadedly engages the nut 25 and the stem of the screw 26 is inserted through a clearance hole 27 in the top of the casing 10. The nut 25 is provided with a rigid arm 28, as seen in Figure 2, which extends through a slot 29 in the casing 10 to prevent rotation of the nut 25. Rotation of the screw 26 will therefore vertically adjust the nut 25 thereby varying the force exerted by the spring 24 on the lever 21. The lower end of a spring 30 engages the ear 23 on the lever 21 and is connected at its upper end to the nut 31 which is also provided with a rigid arm 32 extending through a slot (not shown) in the casing 10 to prevent rotation of the nut. A screw 33 extends loosely through the hole 34 in the top of the casing 10 and screw-threadedly engages the nut 31. Rotation of the screw 33 vertically adjusts the nut 31 to vary the force exerted by the spring 30 on the lever 21.

A U-shaped bracket 36 is riveted to the bottom of the casing 10 and each leg of the bracket carries a pair of stops indicated at 37, 38, 39 and 40. As seen in Figure 1, the springs 24 and 30 normally hold the lever 21 in engagement with the stops 37 and 39. The lever 21 is connected to the lever 16 by means of a T-shaped member 42 which is inserted through a slot in the lever 21 and also through a slot in the lever 16. The head of the T is provided with a knife edge bearing 43 which engages in a pair of depressions 44 in the end of the lever 16. The upper end of the T is provided with a hole 45 through which a knife edge bearing member 46 is inserted and which seats in a pair of depressions 47 in the lever 21. By means of this connection, a counter-clockwise movement of the lever 16 will tend to pull the lever 21 in a downwardly direction as seen in Figure 2.

A mercury switch clip 50 is mounted on an arm 51 pivotally supported by means of the pin 52 connected to the rear of the casing 10. The clip 50 is adapted to support the mercury switch 53 which is held fixedly in the clip by means of the wire 54. The lower end of the arm 51 is provided with a pin 55 which is received between the bifurcations on the end of the actuating arm 56 carried by the lever 16. It will be seen that this structure provides for a rotation of the mercury switch 53 upon rotation of the lever 16.

For the sake of the present discussion it will be assumed that the bellows 11 responds to variations in temperature and that the temperature to which the bellows responds is at a relatively low value. Under these conditions, the bellows 11 will be in its contracted position and the springs 24 and 30 will hold the lever 21 against the stops 37 and 39. Let it be assumed that the spring 30 is adjusted to exert a greater restraining force on the lever 21 than the spring 24. On an increase in temperature, the bellows 11 will expand and rotate the lever 16 in a counter-clockwise direction. The T shaped member 42 will therefore pull downwardly on the lever 21, and as the spring 24 exerts a smaller restraining force on the lever 21 than the spring 30, the lever 21 will first leave the stop 37 and engage the stop 38. This action will account for half of the possible rotation of the lever 16 which will rotate the mercury switch 53 to approximately a horizontal position. This movement will not be sufficient to cause the mercury within the switch 53 to flow to the opposite end of the tube and close the circuit. The parts will remain in this position until the temperature to which the bellows 11 responds increases to a point where the bellows develops sufficient force to overcome the pull exerted by the spring 30. At this time the lever 21 will leave the stop 39 and engage the stop 40. The rotation of the lever 16 necessary to produce this action will rotate the mercury switch 53 sufficiently to cause the mercury to flow to the opposite end of the tube and close the circuit through the switch.

On a decrease in temperature, the bellows will contract and permit the stronger spring 30 to move the lever 21 out of engagement with the stop 40 and into engagement with the stop 39. This will move the mercury switch to approximately a horizontal position which will be ineffective to cause the mercury to flow to the opposite end of the tube and break the circuit therethrough. On a further decrease in temperature, the bellows will have contracted sufficiently to permit the weaker spring 24 to pull the lever 21 out of engagement with the stop 38 and into engagement with the stop 37. The resultant rotation of the lever 16 will move he mercury switch 53 to the position shown in Figure 2, at which time the mercury will flow to the left-hand end of the tube and break the circuit therethrough.

It will be seen by the above operation that the force exerted on the lever 21 by the spring 30 determines the temperature at which the switch will be rotated to closed circuit position regardless of the force exerted by the spring 24 as long as this force is less than the force exerted by the spring 30. Likewise, the force exerted by the spring 24 determines the temperature at which the switch will be rotated to open circuit position regardless of the force exerted by the spring 30 as long as this force is greater than the force exerted by the spring 24. In other words, this device affords independent adjustments of the cut-in and cut-out points of the mercury switch 53. Moreover, the temperatures at which this switch will be opened and closed may be individually observed by noting the positions of the two arms 28 and 32. If desired, scale plates may be mounted on the outside of the casing 10 adjacent these two arms for permitting these temperatures to be read directly in degrees.

Figure 3:
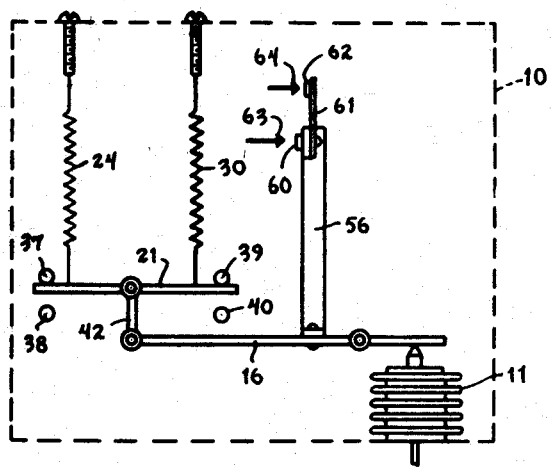
Figure 3 is a more or less diagrammatic view of a slightly different form of my invention.

Figure 3 illustrates more or less diagrammatically a modification of the invention shown in Figures 1 and 2. The bellows 11, lever 16, floating lever 21, springs 24 and 30, and the connecting link 42 may be identical to those disclosed in Figures 1 and 2. In Figure 3, however, the arm 56 instead of actuating a mercury switch carries a first contact 60 and a resilient arm 61 which in turn carries a second contact 62. Contact 60 is adapted to cooperate with a stationary contact 63 and the contact 62 is adapted to cooperate with a second stationary contact 64.

This mechanism is so arranged that when the bellows 11 expands to cause the lever 21 to leave the stop 37 and engage the stop 38, the lever 16 will rotate sufficiently to cause engagement of the contacts 62 and 64. On further expansion of the bellows 11, the lever 21 will separate from the stop 39 and engage stop 40 and this action will permit the lever 16 to rotate sufficiently to cause engagement of the contacts 60 and 63. This further rotation is permitted even though the contacts 62 and 64 have already engaged due to the resiliency of the blade 61.

Likewise, on a decrease in temperature the contacts 60 and 63 will break as the lever 21 moves from stop 40 into engagement with stop 39 and the contacts 62 and 64 will break as the lever 21 moves from stop 38 into engagement with stop 37.

Referring now to the modification disclosed in Figures 4, 5, and 6, an insulating base is indicated at 65. This base carries a supporting U shaped bracket 66 having parallel legs 67 and 68. Mounted in the base 65 is a pair of S shaped brackets 69 and 70. The bracket 69 is shown in Figure 6 but the bracket 70 is only partially shown in section in Figure 5. These brackets are adapted to carry a pair of adjustable contact screws 71 and 72 which cooperate respectively with contacts 73 and 74 mounted on the resilient blades 75 and 76 which are also supported on the base 65. The contacts 73 and 74 are normally biased into engagement with the stationary contacts 71 and 72.

Mounted on the base 65 by means of the screw 78 is a bracket 79 which carries a bellows 80. This bellows may be connected by means of the capillary tube 81 to a thermal bulb or a source of variable pressure as in the case of the bellows 11 in Figures 1 and 2. A knife edge 82 is supported by the legs of the U shaped bracket 66 and this knife edge forms the fulcrum about which the main actuating lever 83 is adapted to rotate. This lever 83 is provided with a depression 84 in which the bearing member 85 carried by the bellows 80 is adapted to seat. A second depression 86 in the lever 83 receives a bearing member 87 on the floating lever 88. The lever 88 extends outwardly through slots 89 in the legs of the U shaped bracket 66 and the extending portions are provided with ears which are received in the slots 90 which act as stops for each end of the lever 88. One end 92 of the lever 88 is provided with a struck-up portion with which the lower end of the spring 93 is engaged. This struck-up portion is not shown in the drawings because it is hidden by the leg 68 in Figure 5. The upper end of the spring 93 is connected to a nut 94 which is screwed onto the screw 95. Screw 95 extends upwardly through the top of the bracket 66 and is connected to a knurled head 96. The nut 94 is provided with a U shaped bracket 97 having a pair of legs 98 and 99 extending through the slot 89 in the leg 68. This bracket guides the vertical movement of the nut 94 and prevents its rotation upon rotation of the knurled head 96. Adjustably connected to the bracket 97 by means of a screw 100 which engages in a slot in the bracket 97 is a calibrating plate 101. The plate 101 is provided with gear teeth 102. An indicating arm 103 is pivoted to the leg 68 as shown at 104 and is provided with a sector 105 having gear teeth 106 which mesh with the teeth 102. Upon rotation of the knurled head 96, the nut 94 and bracket 97 will move vertically and adjust the tension on spring 93. The bracket 97 carries the plate 101 with it and movement of the plate 101 causes rotation of the indicating arm 103 by means of the interengagement of the gear teeth 102 and 106. The position of the arm 103 will therefore indicate the tension on the spring 93. It is obvious that by moving the plate 101 with respect to the bracket 97 by means of the screw and slot connection 100, the indicator can be acurately calibrated.

The leg 67 of the bracket 66 carries an adjusting structure for a second spring 110 which is identical to that just described in connection with the spring 93. It is therefore thought to be unnecessary to describe this mechanism in detail. The top of the bracket 66 is provided with an opening 111 into which the indicating arm 103 and indicating arm 112 which indicates the adjustment of the spring 110 are adapted to extend. This opening is closed by means of a transparent cover 113 having an arcuate channel which receives the two indicating arms. Scale markings may be applied to the transparent cover 113 if desired. Each of the indicating arms 103 and 112 may be marked to indicate which of them controls the energization of the control circuit and which the deenergization of the control circuit.

A spring 108 is wrapped around the axle on which the arms 103 and 112 are pivoted and the ends of the spring are hooked around the arms 103 and 112 to give them a bias. The purpose of this is to take up any backlash which may be present in the gears operating the two arms.

The free end of the lever 83 carries an insulating actuator 115 which is adapted to cooperate with the resilient arms 75 and 76 as the lever 83 is rotated by the bellows 80. It will be seen that the two stationary contacts 71 and 72 are set at different levels with respect to the base 65 so that one of the switches formed thereby (switch 71, 73) will be opened before the other as the actuator 115 moves downwardly.

When the temperature to which the bellows 80 responds is at a relatively low value, the bellows will be in its contracted position and the springs 93 and 110 will hold the lever 88 in its upper position, at which time the insulating actuator 115 will permit both of the switches 71, 73 and 70, 74 to be closed. Assuming that the spring 110 does not exert as great a force as the spring 93, an increase in temperature will expand the bellows 80 rotating the lever 83 in a counter-clockwise direction and pulling the right-hand end of the lever 88 downwardly until it engages its lower stop. This will move the actuating member 115 through half of its travel and cause the contacts 71 and 73 to separate. When the temperature has increased sufficiently for the bellows 80 to develop a sufficient force to overcome the stronger spring 93, it will rotate the lever 83 further in a counter-clockwise direction and cause the left-hand end of lever 88 as viewed in Figure 5 to move downwardly and engage its lower stop. This will permit sufficient movement of the actuating member 115 to cause separation of the contacts 72 and 74. On a decrease in temperature the bellows 80 will contract permitting first the engagement of the contacts 72 and 74 and later the contacts 71 and 73.

This control device is adapted to be used in a circuit such as is indicated schematically in Figure 5. The transformer indicated generally at 115 is provided with a primary winding 116 connected to a source of power by the conductors 117 and 118. The secondary of the transformer is indicated at 119. The circuit is also provided with relay winding 120 which when energized causes the switch arm 121 to engage its stationary contact 122. The relay winding 120 also causes the switch arm 123 to engage the stationary contact 124, this latter switch being connected to any desired load by means of conductors 125 and 126. When the bellows 80 is in its contracted position as shown in Figures 5 and 6, the relay 120 will be energized by a circuit extending from one side of the secondary winding 119 through conductor 130, contacts 74 and 72, conductor 131, conductor 132, switch contacts 73 and 71, conductors 133 and 134, relay winding 120, and conductor 135 back to the other side of the secondary 119. The switch arms 121 and 123 will therefore be in closed circuit position and the circuit to the load will be closed. On an increase in temperature the bellows 80 will expand and separate the contacts 73 and 71 through which the relay winding 120 was energized. This relay winding will be held in, however, through a holding circuit extending from one side of the secondary winding 119 through conductor 130, contacts 74 and 72, conductor 131, conductor 136, switch arm 121, contact 122, conductors 137 and 134, relay winding 120, and conductor 135 back to the other side of the secondary 119. A further increase in temperature at the bellows 80 will cause separation of the contacts 72 and 74 which will deenergize the relay winding 120 and open the load switch 123, 124. On a decrease in temperature the bellows 80 will contract and first close the contacts 72 and 74. Closure of these contacts will not reenergize the relay winding 120 due to the fact that the switch 121, 122 is open. A further decrease in temperature at the bellows 80 will result in the closure of the contacts 71 and 73 which will energize the relay winding 120 through the circuit originally traced.

It will therefore be seen that the contacts 71 and 73 on closing control the energization of the relay 120 and hence the closure of the load switch 123, 124 and that the contacts 72, 74 on opening control the deenergization of the relay winding 120 and hence the opening of the load switch 123, 124. In this sense therefore the control device just described acts as a control for the load switch 123, 124 and each limit of the differential of this switch is controlled independently by the adjustment of the springs 110 and 93. The spring 110 independently controls the closure of the load switch because it controls the temperature at which the contacts 71 and 73 engage. The spring 93 controls the opening of the load switch because it controls the temperature at which the contacts 72 and 74 are separated. These springs 93 and 110 are adjusted by means of the knurled heads 96 and 140 and the rotation of these heads also rotates the indicating arms 103 and 112 within the transparent closure 113. The scale marked on this enclosure may be calibrated in degrees so that the temperature at which the load switch is opened and closed may be read directly.

As certain changes and modifications of this invention may occur to those who are skilled in the art, it is to be understood that I intend to be limited by the scope of the appended claims rather than by the specific embodiments disclosed.

I claim as my invention:

1. In a device of the character described, in combination, a movably mounted control member, a lever, separate means biasing each end of said lever to a first position, said control member being connected to said lever at an intermediate point, a condition responsive device actuating said control member to move first one end and then the other end of said lever to a second position depending upon which of said biasing means exerts the lesser force, and a control device connected to said control member independently of said lever and actuated by said control member.

2. In a device of the character described, in combination, a movably mounted control member, a lever, separate means biasing each end of said lever to a first position, said control member being connected to said lever at an intermediate point, a condition responsive device actuating said control member to move first one end and then the other end of said lever to a second position depending upon which of said biasing means exerts the lesser force, and a switch connected to said control member independently of said lever and operated to closed position by said control member while one end of said lever moves between its first and second positions, and to open position while the other end of said lever moves between its first and second positions.

3. In a device of the character described, in combination, a movably mounted control member, a lever, separate means biasing each end of said lever to a first position, said control member being connected to said lever at an intermediate point, a condition responsive device actuating said control member to move first one end and then the other end of said lever to a second position depending upon which of said biasing means exerts the lesser force, a switch operated to closed position by said control member while one end of said lever moves between its first and second positions, and to open position while the other end of said lever moves between its first and second positions, and means for separately adjusting said biasing means whereby the condition values at which said switch is opened and closed may be independently varied.

4. In a device of the character described, in combination, a movably mounted control member, a lever, separate means biasing each end of said lever to a first position, said control member being connected to said lever at an intermediate point, a condition responsive device actuating said control member to move first one end and then the other end of said lever to a second position depending upon which of said biasing means exerts the lesser force, a pair of switches, and actuating means for said switches connected to said control member independently of said lever, one of said switches being actuated by said actuating means while one end of said lever moves between its first and second positions, and the other of said switches being actuated by said actuating means while the other end of said lever moves between its first and second positions.

5. In a device of the character described, in combination, a movably mounted control member, a lever, separate means biasing each end of said lever to a first position, said control member being connected to said lever at an intermediate point, a condition responsive device actuating said control member to move first one end and then the other end of said lever to a second position depending upon which of said biasing means exerts the lesser force, a pair of switches, one of said switches being actuated by said control member while one end of said lever moves between its first and second position, and the other of said switches being actuated by said control member while the other end of said lever moves between its first and second positions, and means for separately adjusting said biasing means whereby the condition values at which each switch is actuated may be independently varied.

6. In a device of the character described comprising in combination, a floating lever, a first stop, a first spring normally holding one end of said lever against said stop, a second stop, a second spring normally holding the other end of said lever against said second stop, the force exerted by said first spring being less than that exerted by said second spring, third and fourth stops, a movable member connected to said lever at a point intermediate its ends, a switch mounted for actuation by said movable member, and a condition responsive device for moving said movable member from a first position in which said lever engages said first and second stops to an intermediate position in which said one end of said lever engages said third stop and said other end engages said second stop, continued movement of said movable member by said condition responsive device causing the other end of said lever to engage said fourth stop and said movable member to assume a second position, said movable member actuating said switch in one direction as it moves from said intermediate position to said second position and in the opposite direction as it moves from said intermediate position back to said first position.

7. In a device of the character described comprising in combination, a floating lever, a first stop, a first spring normally holding one end of said lever against said stop, a second stop, a second spring normally holding the other end of said lever against said second stop, the force exerted by said first spring being less than that exerted by said second spring, third and fourth stops, a movable member connected to said lever at a point intermediate its ends, a pair of switches, and a condition responsive device for moving said movable member from a first position in which said lever engages said first and second stops to an intermediate position in which said one end of said lever engages said third stop and said other end engages said second stop, continued movement of said movable member by said condition responsive device causing the other end of said lever to engage said fourth stop and said movable member to assume a second position, said movable member actuating the first of said pair of switches to closed position as it moves from said first to said intermediate position and the other of said switches to closed position as it moves from said intermediate position to said second position.

8. In a device of the character described, in combination, a movably mounted control member, a lever, separate means biasing each end of said lever to a first position, said control member being connected to said lever at an intermediate point, a condition responsive device actuating said control member to move first one end and then the other end of said lever to a second position depending upon which of said biasing means exerts the lesser force, a pair of switches, one of said switches being actuated by said control member while one end of said lever moves between its first and second positions, and the other of said switches being actuated by said control member while the other end of said lever moves between its first and second positions, a cover for said switches, control member, lever, and biasing means, means extending through said cover for independently adjusting said biasing means, a window in said cover, and means visible through said window for indicating the adjustment of said biasing means.

9. In a device of the character described comprising in combination, a cover, switch means within said cover, a condition responsive device for actuating said switch means at two different values of the condition, means for adjusting said condition values including a pair of springs, a pair of nuts connected to said springs, a pair of screws engaging said nuts and extending through said cover for adjusting said springs, a pair of arms rotated by said nuts, an opening in said cover, and an arcuate transparent closure for said opening with which said arms cooperate to indicate the adjustment of said springs.

10. In combination, a rotatably mounted control member, a condition responsive device for causing said member to rotate in one direction on an increase in the value of said condition and in the opposite direction on a decrease in the value of said condition, a first means determining the condition value at which said member is rotated during only one portion of its total rotative movement, a second means determining the condition value at which said member is rotated during only the remainder of its total rotative movement, a switch, said switch being operated to open position while said member is rotating in said one portion of its total rotative movement, and to closed position while said member is rotating in the said remainder of its total rotative movement, and means for individually adjusting said first and second means whereby the condition values at which said switch is operated to open and closed positions may be independently varied.

11. In combination, a rotatably mounted control member, a condition responsive device for causing said member to rotate in one direction on an increase in the value of said condition and in the opposite direction on a decrease in the value of said condition, a first means determining the condition value at which said member is rotated during only one portion of its total rotative movement, a second means determining the condition value at which said member is rotated during only the remainder of its total rotative movement, a pair of switches, said control member actuating the first of said switches during said one portion of its total rotative movement, and the other of said switches during the remainder of its total rotative movement, and means for individually adjusting said first and second means whereby the condition values at which each switch is actuated may be independently varied.

12. In combination, a rotatably mounted control member, a condition responsive device for causing said member to rotate in one direction on an increase in the value of said condition and in the opposite direction on a decrease in the value of said condition, a first means determining the condition value at which said member is rotated during only one portion of its total rotative movement, a second means determining the condition value at which said member is rotated during only the remainder of its total rotative movement, a pair of switches, said control member actuating the first of said switches during said one portion of its total rotative movement, and the other of said switches during the remainder of its total rotative movement, a cover for said switches, control member, and first and second means, means extending through said cover for independently adjusting said first and second means, a window in said cover, and means visible through said window for indicating the adjustment of said first and second means.

13. In combination, a rotatably mounted control member, a condition responsive device rotating said member between limits, lever mechanism, first and second means acting through said lever mechanism on said control member, said first means determining the condition value at which said member is rotated within one portion of its movement only, said second means determining the condition value at which said member is rotated within the remaining portion of its movement only, and a switch operatively associated with said control member at a point spaced from that at which said first and second means act on said member, said control member actuating said switch to closed position within said one portion of its movement, and to open position within the remaining portion of its movement.

14. In a device of the character described, in combination, a rotatably mounted control member, a floating lever capable of rotation, separate means biasing each end of said lever to a first position, said control member being pivotally connected to said lever at an intermediate point and the axis of rotation of said control member being transverse with respect to the axis of rotation of said lever, and a condition responsive device actuating said control member to move first one end and then the other end of said lever to a second position depending upon which of said biasing means exerts the lesser force.

ALBERT E. BAAK.